United States Patent
Seitz et al.

(10) Patent No.: US 9,931,974 B2
(45) Date of Patent: Apr. 3, 2018

(54) LIGHTING SYSTEM FOR A MOTOR VEHICLE AND MOTOR VEHICLE HAVING A LIGHTING SYSTEM

(71) Applicants: AUDI AG, Ingolstadt (DE); VOLKSWAGEN AG, Wolfsburg (DE)

(72) Inventors: Guenther Seitz, Koesching (DE); Arndt Boehme, Gifhorn (DE); Charlotte Helene Franz, Karlsfeld (DE); Katrin Lohmueller, Munich (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/508,026

(22) PCT Filed: Sep. 1, 2015

(86) PCT No.: PCT/EP2015/001764
§ 371 (c)(1),
(2) Date: Mar. 1, 2017

(87) PCT Pub. No.: WO2016/034282
PCT Pub. Date: Mar. 10, 2016

(65) Prior Publication Data
US 2017/0297475 A1    Oct. 19, 2017

(30) Foreign Application Priority Data
Sep. 5, 2014    (DE) .................. 10 2014 013 185

(51) Int. Cl.
*B60Q 1/14* (2006.01)
*B60Q 1/00* (2006.01)
(Continued)

(52) U.S. Cl.
CPC ............ *B60Q 1/0076* (2013.01); *B60K 35/00* (2013.01); *B60Q 1/04* (2013.01); *B60Q 1/30* (2013.01);
(Continued)

(58) Field of Classification Search
CPC ................... B60Q 2200/00; B60Q 2400/00
(Continued)

(56) References Cited

U.S. PATENT DOCUMENTS 5,382,877 A * 1/1995 Katsumata ........... B60Q 1/1415
315/291
5,773,935 A * 6/1998 Wagner ................. B60Q 1/076
307/10.8
(Continued)

FOREIGN PATENT DOCUMENTS

DE    102004022813 A1    12/2005
DE    102012015062 A1    5/2014
(Continued)

OTHER PUBLICATIONS

English Translation dated Mar. 16, 2017 of International Preliminary Report on Patentability for PCT/EP2015/001764.
(Continued)

*Primary Examiner* — Thuy Vinh Tran
(74) *Attorney, Agent, or Firm* — Staas & Halsey LLP

(57) ABSTRACT

In a motor vehicle having motor vehicle exterior lighting devices and an operator control device, the following lighting modes of the motor vehicle exterior lighting devices can be set: deactivated, parking light, daytime running light, forwarding lighting, and automatic mode in which the motor vehicle exterior lighting devices are operated by an automatic forward light controller. The operator control device further has a single monostable operator control element by which the lighting modes can be set; or the operator control
(Continued)

device has a monostable operator control element by which the deactivated, parking light, daytime running light and forward lighting lighting modes can be set. The operator control device has a pushbutton key or a toggle lever by which the automatic mode can be set.

20 Claims, 3 Drawing Sheets

(51) Int. Cl.
  *B60Q 1/04* (2006.01)
  *B60Q 1/30* (2006.01)
  *B60Q 1/48* (2006.01)
  *B60K 35/00* (2006.01)
(52) U.S. Cl.
  CPC ........ *B60Q 1/486* (2013.01); *B60K 2350/106* (2013.01); *B60K 2350/1028* (2013.01); *B60K 2350/1076* (2013.01); *B60K 2350/352* (2013.01); *B60Q 2200/00* (2013.01); *B60Q 2300/112* (2013.01); *B60Q 2300/14* (2013.01); *B60Q 2300/312* (2013.01); *B60Q 2300/314* (2013.01); *B60Q 2400/00* (2013.01); *B60Q 2400/30* (2013.01)
(58) Field of Classification Search
  USPC .......................................... 315/77, 79, 82, 84
  See application file for complete search history.

(56) References Cited

U.S. PATENT DOCUMENTS

| | | | |
|---|---|---|---|
| 7,619,511 B2* | 11/2009 | Kesterson | B60Q 1/20 315/82 |
| 7,759,819 B2* | 7/2010 | Michiyama | B60Q 1/1423 200/61.54 |
| 2007/0276551 A1 | 11/2007 | Brod | |

FOREIGN PATENT DOCUMENTS

| | | |
|---|---|---|
| WO | 2009040663 A2 | 4/2009 |
| WO | 2010/076589 A1 | 7/2010 |
| WO | 2014/030028 A1 | 2/2014 |

OTHER PUBLICATIONS

International Search Report for PCT/EP2015/001764 dated Dec. 1, 2015.
German OA for Application No. 102014013185.8 dated Aug. 5, 2015.
PCT/EP2015/001764, dated Sep. 1, 2015, Seitz et al., Audi AG Volkswagen AG.
DE102014013185.8, dated Sep. 5, 2014, Seitz, Audi AG Volkswagen AG.

* cited by examiner

LIGHTING SYSTEM FOR A MOTOR VEHICLE AND MOTOR VEHICLE HAVING A LIGHTING SYSTEM

CROSS REFERENCE TO RELATED APPLICATIONS

This application is the U.S. national stage of International Application Ser. No. PCT/EP2015/001764, filed Sep. 1, 2015 and claims the benefit thereof. The International Application claims the benefit of German Application No. 102014013185.8 filed on Sep. 5, 2014, both applications are incorporated by reference herein in their entirety.

BACKGROUND

Described below is a lighting system for a motor vehicle and a motor vehicle having a lighting system.

For safety reasons it is desirable that a lighting device of a motor vehicle, specifically, in particular, vehicle headlights of the motor vehicle are automatically switched on in the case of weak daylight, for example a light intensity of less than 1000 lux, or even when it is dark. Furthermore, for reasons of energy efficiency it is desirable that in the case of strong daylight, for example a light intensity of more than 7000 lux, a dipped headlight is switched off automatically.

US 2007/0276551 A1 presents a method for operating a lighting device of a motor vehicle in which the lighting device of the motor vehicle is operated by an automatic forward lighting controller of the motor vehicle if the lighting device has been placed in an automatic mode. There is provision here that the lighting device is in turn placed in a manual mode as soon as the ignition of the motor vehicle has been deactivated.

DE 10 2012 015 062 A1 also presents a method for operating a lighting device of a motor vehicle. As soon as actuation of a pushbutton key has been sensed, a context of the motor vehicle is sensed and a lighting state of the lighting device is set as a function of the actuation of the pushbutton element and of the sensed context of the vehicle. The term context of the vehicle is to be understood here as meaning the circumstances of the vehicle, for example the position of the vehicle, ambient brightness and/or information about an operating state of the vehicle.

DE 10 2004 022 813 A1 presents a method for operating a motor vehicle headlight. The dipped headlight is switched on when an input signal which indicates a state of a switched-on ignition is present, an input signal which indicates a stationary state of the vehicle is present, and when further predetermined input signals are present.

SUMMARY

The lighting system described herein provides for particularly safe, comfortable and energy-efficient operation of a motor vehicle exterior lighting device.

Described below is a lighting system for a motor vehicle as well as a motor vehicle having such a lighting system.

The lighting system for a motor vehicle described below includes a motor vehicle exterior lighting device and an operator control device by which the following lighting modes of the motor vehicle exterior lighting device can be set: deactivated, parking light, daytime running light, forward lighting and automatic mode, in which the motor vehicle exterior lighting device is operated by an automatic forward lighting controller. The lighting system described below is distinguished by the fact that the operator control device has a single monostable operator control element by which the lighting modes can be set. Alternatively, the operator control device has a monostable operator control element by which the deactivated, parking light, daytime running light and forward lighting lighting modes can be set, wherein the operator control device has a pushbutton key or second toggle lever by which the automatic mode can be set.

A monostable operator control element is distinguished by the fact that of two or more possible states only one is stable, which state corresponds usually to a position of rest. Other states which correspond to a working position are maintained only for as long as an external force acts on the monostable operator control element, which external force prevents the monostable operator control element from returning to its position of rest. For example, the monostable operator control element can be embodied as a pushbutton key, toggle lever or rotary knob.

The lighting system described below counteracts the problem that a mechanically rasterized switch position under certain circumstances does not correspond to the current lighting mode. In other words, the lighting system described below resolves the conflict between a rasterized switch position and a currently set, in particular automatically set, lighting mode.

According to the first embodiment, the operator control device has a single monostable operator control element by which the lighting modes can be set. In addition, there can be two further pushbutton keys or else toggle levers for activating and deactivating fog lamps and rear fog lights. The lighting system described below results in particularly large degrees of freedom in terms of design in that, for example, the operator control device can be integrated into a decorative strip of a motor vehicle, which would not be possible, for example, with rotary knob solutions. Furthermore, the lighting system described below results in a particularly simple operator control concept, in particular if according to the first alternative the operator control device has just one monostable operator control element. Furthermore, there is resulting reduced cognitive complexity since only one monostable operator control element or at most one monostable operator control element and a further pushbutton key or a further toggle lever plus fog functions are present. In addition, the possibility of blind operator control is significantly improved by the lighting system described below. Furthermore, it is possible for country-specific legal requirements with respect to the operation of the lighting system to be covered quite simply by corresponding software encoding.

In an advantageous refinement, there is provision that the lighting system is designed to activate the automatic mode as soon as it has been sensed on the basis of at least one criterion that a new driving event and/or a change of driver have/has taken place. In other words, after a restart of the motor vehicle the automatic mode is always automatically activated, the motor vehicle exterior lighting device may be operated by an automatic forward lighting controller in the automatic mode. If the driver wishes to deviate from the current automatic mode, he can change into respective functions which are dependent on the driving situation and, for example, activate only the forward lighting during travel, and, for example, also completely deactivate the lighting system in the stationary state. Particularly safe operation of the lighting system is ensured if the automatic mode is always activated as soon as it has been sensed on the basis of at least one criterion that a new driving event and/or a change of driver has taken place.

In a further advantageous refinement, there is provision that the lighting system is designed to activate the automatic mode as soon as the ignition of the motor vehicle has been activated. In this context, the lighting system may be designed to activate the automatic mode only when one of the parking light, daytime running light, forward lighting or automatic mode lighting modes was activated at the time of a previous deactivation of the ignition of the motor vehicle. In other words, there is no automatic activation of the automatic mode after the activation of the ignition if a driver has manually deactivated the forward lighting before the motor vehicle was shut down or deactivated. This contributes to ensuring that, in particular, in the case of xenon headlights, the latter are not unnecessarily heavily loaded by being switched on again automatically, which has a positive effect on their service life. This may be advantageous, for example, if a driver has shut down the motor vehicle in his garage and had already deactivated the forward lighting. If the driver or another driver enters the motor vehicle again, it may be desirable for the forward lighting not to be switched on automatically when the ignition is activated, even in the case of correspondingly low ambient brightness. In addition, there may be provision that the parking light has been activated when the motor vehicle is shut down. The parking light remains switched on even after deactivation of the ignition, that is to say even in a terminal 15 off state. As soon as the motor vehicle is activated again, that is to say the terminal 15 on state occurs, there are two possibilities. Either the parking light firstly remains once again activated in this case and the automatic mode is not activated until the motor vehicle has first exceeded a predefined speed, for example 10 km/h. Alternatively, it is also possible that with the activation of the motor vehicle, that is to say with the terminal 15 on state, the automatic mode is directly activated.

In a further advantageous refinement, there is provision that the lighting system is designed to activate the automatic mode as soon as the motor vehicle first exceeds a predefined speed, in particular 10 km/h, after activation of the ignition. In other words, there is provision that the automatic mode is not activated until a speed which is considered to be critical and is predefined is exceeded. As a result, particularly safe operation of the lighting system and therefore of the motor vehicle is also made possible.

A further advantageous refinement provides that the lighting system is designed to infer a new driving event and/or a change of driver, in particular, when the ignition of the motor vehicle is still deactivated, on the basis of acquired information about opening or closing a door of the motor vehicle. On the basis of a corresponding door signal, a new driving event and/or a change of driver can be inferred easily and reliably also permitting particularly safe and reliable operation of the lighting system to be ensured. Alternatively or additionally, it is also possible for seat-occupation sensors which are provided in the motor vehicle to be correspondingly used in order to sense whether a driver has exited the vehicle and got in again.

In a further advantageous refinement, there is provision that the lighting system is designed to prevent, as a function of the speed of the motor vehicle, the ambient brightness and/or the motor mode of the motor vehicle, the activation of specific lighting modes by actuating the operator control device. If a driver enters, for example, the motor vehicle, and the engine is still switched off or the terminal 15 off state is set the driver can choose, by actuating the operator control device, only between the automatic mode, a parking light and deactivation of the motor vehicle exterior lighting device. Despite actuation of the operator control device, the driver cannot at all select a forward lighting function. If the ignition of the motor vehicle is actuated and the terminal 15 on state is set, the driver can then basically also select the forward lighting by actuating the operator control device. The same also applies up to a speed of less than 10 km/h. As soon as the motor vehicle is moved at more than 10 km/h, the driver can still change manually only between the safe automatic mode and the forward lighting by actuating the operator control device. However, depending on legislation there may also be provision for the driver also to be able to deactivate the motor vehicle exterior lighting device. However, in this context there may be provision that, for example, boundary lights or a parking light remain active.

A further advantageous embodiment provides that the lighting system is designed to control a display device of the motor vehicle in such a way that only the lighting modes which can be selected by actuating the operator control device are displayed. The display device can for example be a combination instrument or some other display which is arranged in the motor vehicle. The lighting system also may be designed to display the respectively currently selected lighting mode, for example also in a combination instrument or some other display of the motor vehicle. For example there may also be provision that the currently selected lighting mode is displayed in the vicinity of the operator control device. As a result of the fact that only the lighting modes which can actually currently also be selected manually are displayed, the driver of the motor vehicle can immediately recognize which lighting modes he can still at all select manually if he would like to override the activated automatic mode.

According to a further advantageous embodiment, there is provision that the lighting system is designed to control the display device in such a way that the lighting modes which can be selected are displayed only when it is sensed that the operator control device is touched. As a result, in particular a driver of the motor vehicle is not unnecessarily distracted by corresponding dazzling. In this context, there may also be provision that the information relating to the manually changeable lighting mode is displayed only for as long as the operator control device is touched. Alternatively, there may also be provision that after the operator control device is touched the lighting mode which can be actuated remains switched on or can be switched off again at least for a predefined period—even if the operator control device is not touched further—for example for 5 seconds. In the event of the touch-sensitive system not being used, it is also possible that after a predefined period of non-operation of the operator control device tapping or pressing on the operator control device does not bring about a change of mode but instead only the selectable lighting modes are displayed. If the operator control device is then tapped or pressed again within a predefined time window, a change of mode which corresponds to the actuation is brought about.

According to a further advantageous embodiment, there is provision that the operator control device is of touch-sensitive and/or pressure-sensitive design. If the operator control device is embodied as a pushbutton key, it can be embodied, for example, in a mechanical fashion and/or as a sensor. For example, the operator control device can include force sensors or touch sensors by which the actuation of the operator control device can be sensed. The operator control device can also be embodied as a type of jointless keypad or sensor pad. In this context, the operator control device may have one or more actuators by which haptic feedback can be output when the operator control device is actuated.

A motor vehicle is described below that includes the lighting system.

Further advantages, features and details of the invention emerge from the following description of a preferred exemplary embodiment and with reference to the drawings. The features and combinations of features mentioned above in the description and the features and combinations of features specified below in the description of the figures and/or only shown in the figures can be used not only in the respectively specified combination but also in other combinations or alone without departing from the scope of the invention.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Reference will now be made in detail to the preferred embodiments, examples of which are illustrated in the accompanying drawings, wherein identical or functionally identical elements are provided with the same reference symbols in the figures.

Figure 1:
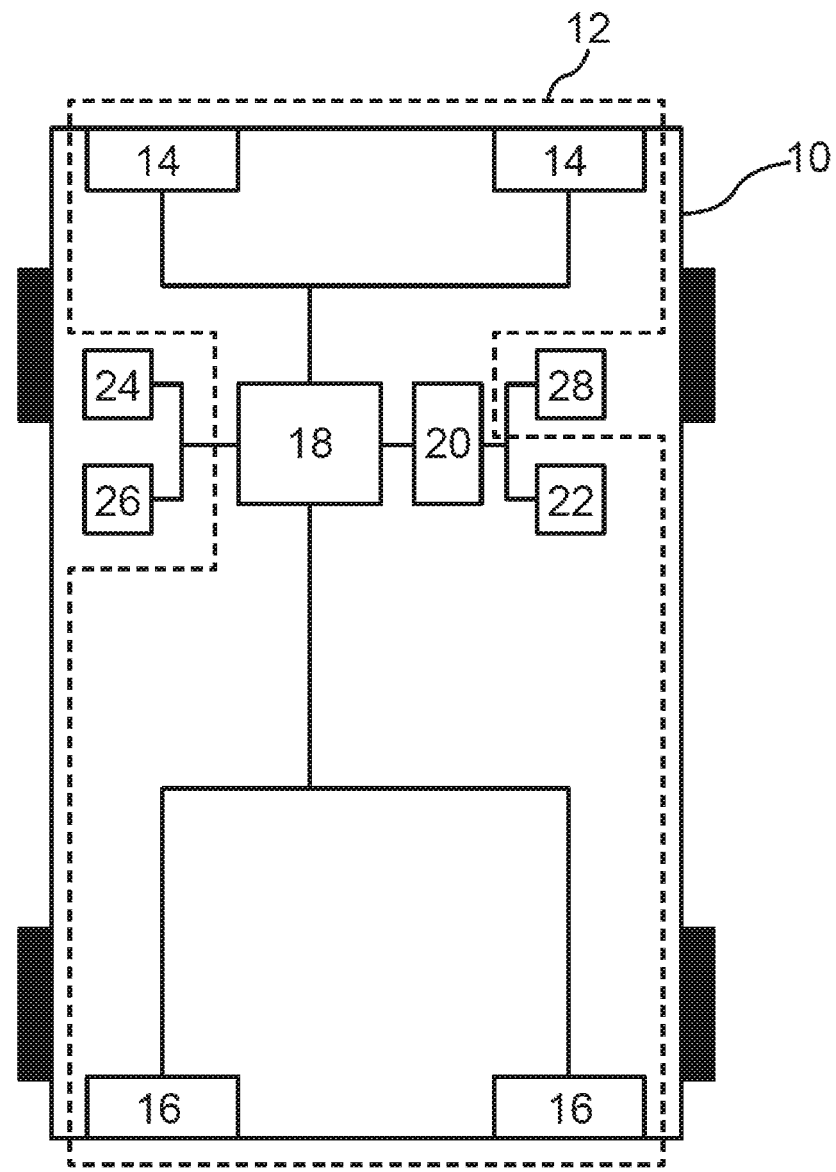
FIG. 1 is a block diagram of a motor vehicle having a lighting system.

A motor vehicle 10 is shown in a schematic illustration in FIG. 1. The motor vehicle 10 has a lighting system 12 inside the dashed line. The lighting system 12 has a motor vehicle exterior lighting device (not denoted in more detail) which includes headlights 14 and rear lights 16. Furthermore, the lighting system 12 includes an automatic forward lighting controller 18, a control device 20 and an operator control device 22.

The vehicle headlights 14 and optionally also the rear lights 16 can be operated in an automatic mode by the automatic forward lighting controller 18. In other words, the automatic forward lighting controller 18 makes available an automatic lighting system so that in the automatic mode the external vehicle lighting is controlled automatically as a function of ambient conditions and no longer directly by the driver. The automatic forward lighting controller 18 is coupled for this purpose to a light sensor 24 and to a rain sensor 26, with the result that the automatic forward lighting controller 18 receives corresponding information about the ambient conditions of the motor vehicle 10 and can control the front headlights and the rear lights according to requirements.

The lighting system 12 is designed to activate the automatic mode as soon as it has been sensed on the basis of at least one criterion that a new driving event and/or a change of driver has taken place. The control device 20 can be designed to place the motor vehicle exterior lighting device, that is to say the front headlights 14 and optionally also the rear lights 16 in the automatic mode as soon as the ignition 28 of the motor vehicle 10 has been activated. The lighting system 12 or the control device 20 can additionally be designed to activate the automatic mode only when one of the parking light, daytime running light, forward lighting or automatic mode lighting modes was activated at the time of a previous activation of the ignition 28 of the motor vehicle 10. In other words, the automatic mode is not activated automatically when the ignition 28 is activated if, for example, a driver of the motor vehicle 10 should have manually deactivated the front headlights 14 and rear lights 16 when the motor vehicle 10 is shut down.

Figure 2:
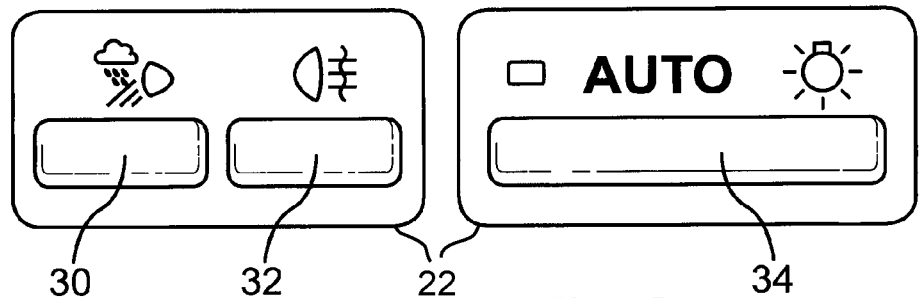
FIG. 2 is a front view of an operator control device of the lighting system by which an automatic forward lighting controller of the lighting system can be activated and deactivated, as well as two operator control elements for activating fog lamps and one rear fog light.

FIG. 2 shows a first embodiment of the operator control device 22. The operator control device 22 is embodied here as a single toggle lever by which the following lighting modes of the motor vehicle exterior lighting device can be set: deactivated, parking light, daytime running light, forward lighting and automatic mode, in which the motor vehicle exterior lighting device is operated by the automatic forward lighting controller 18. The operator control device 22 which is embodied as a toggle lever is of monostable design here. That is to say the toggle lever is always returned automatically into a home position as soon as a force, for example upward or downward, is no longer applied to the toggle lever. The toggle lever can be embodied, for example, in such a way that it can be deflected from the stable home position either just in one direction or else in two directions. Furthermore, two further operator control elements 30, 32 are shown which are also embodied here as toggle levers and serve to activate or deactivate fog lamps and a rear fog light. The toggle lever 22 can have a touch-sensitive surface 34 which, when touched causes the lighting modes which can be selected by actuating the toggle lever 22 to be displayed automatically.

Alternatively it is also possible for the operator control device 22 and the two further operator control elements 30, 32 to be embodied as mechanical pushbutton keys. The mechanical pushbutton keys are also of monostable design in this case. The pushbutton keys therefore always return automatically to a home position as soon as a force is no longer applied to the pushbutton keys.

In addition, it is also possible for the operator control device 22 and the two further operator control elements 30, 32 to be embodied in the form of an actuator switch panel. The actuator switch panel has here a jointless optical system, wherein the operator control device 22 and the further operator control elements 30, 32 are designed to provide haptic feedback as soon as they are actuated by a user. The operator control device 22, that is to say in this case the respective keypad in the actuator control panel, are assigned corresponding displays here which serve as status feedback. The currently activated lighting mode can be displayed by the displays, that is to say, for example that the parking light, the dipped headlight or the automatic mode is currently activated.

In addition, it is also possible for the operator control device 22 to be embodied in the form of a rotary knob or rotary ring, wherein a pushbutton key may be arranged inside the rotary knob. The operator control device 22 which is embodied as a rotary knob is in turn of monostable design. This means that the rotary knob always returns automatically into a home position as soon as a force is no longer applied to the rotary knob, for example counter to or in the clockwise direction. Using the rotary knob, it is possible to select the various lighting modes by turning the latter e.g. counter to or in the clockwise direction. In other words, the rotary knob can be rotated unidirectionally or bidirectionally. The automatic mode can be activated by the pushbutton key which is arranged centrally inside the rotary knob. The pushbutton key is assigned a status display here which indicates whether the automatic mode is currently activated or deactivated. As soon as the rotary knob is actuated when the automatic mode is activated, the automatic mode is automatically deactivated and another lighting mode, corresponding to the actuation of the rotary knob, is actuated. A pop-up display indicates here the currently activated lighting mode in the form of a status information item. The rotary knob can also be of touch-sensitive design. As soon as the rotary knob is touched, those lighting modes which can currently be selected are indicated by a display device in each case.

Figure 3:
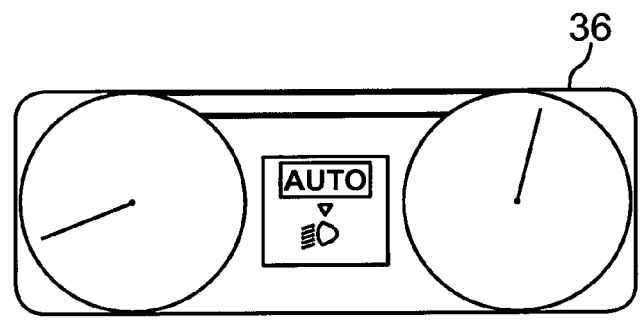
FIG. 3 is a schematic illustration of a combination instrument of the motor vehicle, wherein selectable lighting modes are displayed.

FIG. 3 illustrates a combination instrument 36 of the motor vehicle 10. The motor vehicle 10 is moved along at a speed of higher than 10 km/h in the present case. As soon as the driver touches the operator control device 22, it is indicated to him on the combination instrument 36 that in the automatic mode he could still select the forward lighting manually. Further lighting modes are not offered to him in this case. Alternatively, for example depending on the legislation, it may also be provided that the driver can also deactivate the headlights 14 and/or rear lights 16 by actuating the toggle lever 22. Depending on the configuration of the operator control device 22, the selectable lighting modes can be indicated vertically or horizontally in the combination instrument 36. If the operator control device 22 is embodied as a toggle lever the display may be vertical. If the operator control device 22 is embodied as a pushbutton key or rotary knob, the display is may be horizontal.

Figure 4:
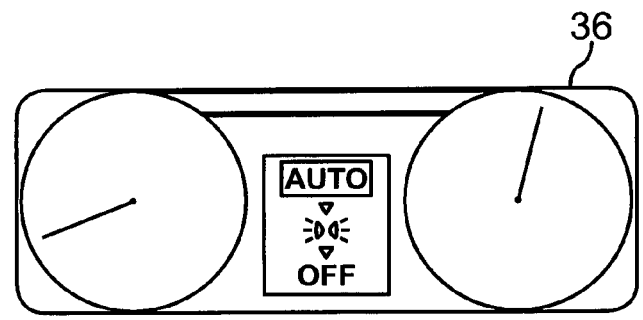
FIG. 4 is a further schematic illustration of the combination instrument which includes a switch-off possibility of the lighting system.

The combination instrument 36 is illustrated again in FIG. 4. Here, the engine of the motor vehicle 10 is not yet started, with the result that only the possibilities of making available parking light and deactivating the vehicle exterior lighting device are provided as selection possibilities in addition to the automatic mode.

As already mentioned, the lighting system 12 is designed to activate the automatic mode as soon as it has been sensed on the basis of at least one criterion that a new driving event and/or a change of driver has taken place. One criterion here can be whether the ignition system 28 of the motor vehicle 10 has currently been activated. The lighting system 12 can also be embodied in such a way that it activates the automatic mode as soon as the motor vehicle 10 first exceeds a predefined speed, in particular 10 km/h, after the activation of the ignition. A further indication for the detection of a new driving event or a change of driver can also be a corresponding door signal. For example, the lighting system 12 can be designed to activate the automatic mode as soon as a door of the motor vehicle 10 has been opened or closed when the ignition of the motor vehicle 10 is still deactivated. In addition, corresponding seat-occupation sensors can also be used to detect whether a driver has currently exited the motor vehicle 10 or entered it again.

The lighting system 12 is also designed to prevent the activation of specific lighting modes by actuating the operator control device 22 as a function of the speed of the motor vehicle and/or the ambient brightness and as a function of deactivation or activation of the engine. As already mentioned, the lighting system 12 is designed to control a display device, according to the embodiments in FIGS. 3 and 4 the combination instrument 36, in such a way that only the lighting modes which can be selected by actuating the operator control device 22 are displayed.

Figure 5:
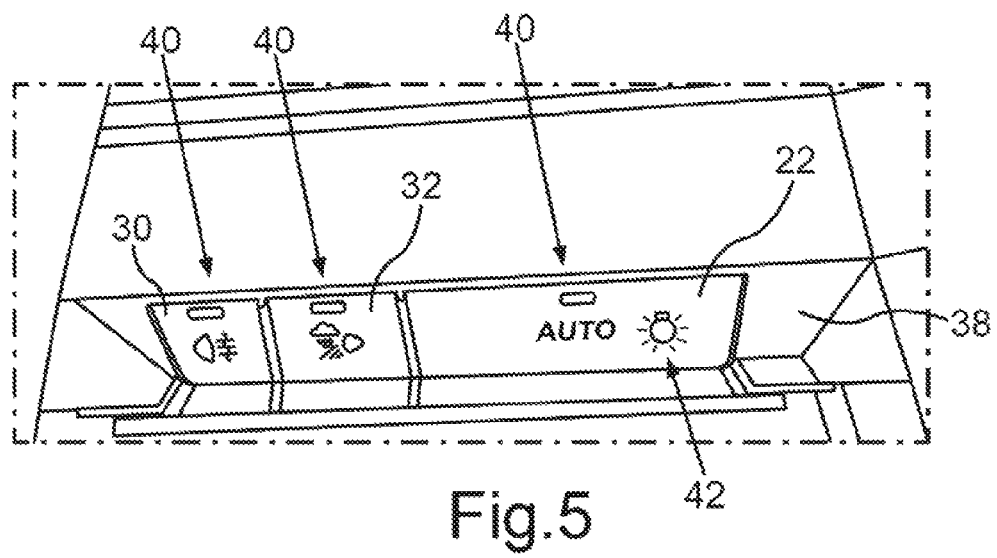
FIG. 5 is a partial perspective view of an alternative embodiment of the operator control device and of the operator control element for actuating the rear fog lights and the fog lamps, wherein these elements are integrated into a decorative strip of the motor vehicle.

FIG. 5 shows an alternative embodiment of the operator control device 22. As is apparent, the operator control device 22 and the further operator control elements 30, 32 are integrated in the region of a decorative strip 38 of the motor vehicle. The operator control device 22 is embodied here as a single pushbutton key by which the different lighting modes of the motor vehicle exterior lighting device can be set. Alternatively, the pushbutton key 22 could also be arranged above the decorative strip 38. The pushbutton key 22 can be embodied here, for example, as a jointless pushbutton key with a capacitive sensor system. In addition, the pushbutton key 22 can also have a corresponding pressure detector and haptic feedback. In the present embodiment, all the lighting functions apart from the fog light functions can be set by the single pushbutton key 22. The operator control elements 30, 32 and the pushbutton key 22 each have status lights 40 by which a respective lighting mode can be signaled. In the present case, the status light 40 of the pushbutton key 22 merely indicates whether the automatic mode is set or not. Furthermore, the pushbutton key 22 has a further display 42 by which a status feedback is indicated. It indicates which lighting mode is currently activated apart from or in addition to the automatic mode, that is to say whether the parking light, the dipped headlights or the like are activated.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A lighting system for a motor vehicle, comprising:
an automatic forward light controller;
a motor vehicle exterior lighting device operated by the automatic forward light controller in an automatic mode of the lighting system; and
an operator control device having a monostable operator control element setting lighting modes of deactivated, parking light, daytime running light and forward lighting, and having one of a pushbutton key and a toggle lever by which the automatic mode is set.

2. The lighting system as claimed in claim 1, wherein the lighting system activates the automatic mode upon detection of at least one criterion indicating at least one of a new driving event and a change of driver has occurred.

3. The lighting system as claimed in claim 1, wherein the motor vehicle has an ignition switch, and
wherein the lighting system activates the automatic mode upon activation of the ignition switch of the motor vehicle.

4. The lighting system as claimed in claim 3, wherein the lighting system activates the automatic mode only when one of the parking light, the daytime running light, the forward lighting and the automatic mode was activated at an immediately previous deactivation of the ignition switch of the motor vehicle.

5. The lighting system as claimed in claim 1, wherein the lighting system activates the automatic mode when the motor vehicle first exceeds a predefined speed after activation of the ignition switch.

6. The lighting system as claimed in claim 5, wherein the predefined speed is 10 km/h.

7. The lighting system as claimed in claim 1, wherein the motor vehicle has doors and an ignition switch, and
wherein the lighting system infers at least one of a new driving event and a change of driver when the ignition switch of the motor vehicle is deactivated when at least one of opening and closing at least one of the doors of the motor vehicle is detected.

8. The lighting system as claimed in claim 1, wherein the lighting system prevents selection of specific lighting modes by the operator control device based on at least one of a speed of the motor vehicle, ambient brightness and a motor mode of the motor vehicle.

9. The lighting system as claimed in claim 8, wherein the motor vehicle has a display device, and
wherein the lighting system controls the display device of the motor vehicle so that only selectable lighting modes which can be selected by the operator control device are displayed.

10. The lighting system as claimed in claim 9, wherein the lighting system controls the display device so that the selectable lighting modes are displayed only upon sensing that the operator control device has been touched.

11. The lighting system as claimed in claim 1, wherein the operator control device includes at least one of a touch-sensitive and a pressure-sensitive input surface.

12. A motor vehicle, comprising:
a lighting system, including
an automatic forward light controller;
a motor vehicle exterior lighting device operated by the automatic forward light controller in an automatic mode of the lighting system; and
an operator control device having one of a pushbutton key and a toggle lever by which the automatic mode is set, and having a monostable operator control element setting lighting modes of deactivated, parking light, daytime running light and forward lighting.

13. The motor vehicle as claimed in claim 12, wherein the lighting system activates the automatic mode upon detection of at least one criterion indicating at least one of a new driving event and a change of driver has occurred.

14. The motor vehicle as claimed in claim 12,
further comprising an ignition switch, and
wherein the lighting system activates the automatic mode upon activation of the ignition switch of the motor vehicle.

15. The motor vehicle as claimed in claim 14, wherein the lighting system activates the automatic mode only when one of the parking light, the daytime running light, the forward lighting and the automatic mode was activated at an immediately previous deactivation of the ignition switch.

16. The motor vehicle as claimed in claim 12, wherein the lighting system activates the automatic mode when the motor vehicle first exceeds a predefined speed after activation of the ignition switch.

17. The motor vehicle as claimed in claim 12,
further comprising doors and an ignition switch, and
wherein the lighting system infers at least one of a new driving event and a change of driver when the ignition switch is deactivated when at least one of opening and closing at least one of the doors is detected.

18. The motor vehicle as claimed in claim 12, wherein the lighting system prevents selection of specific lighting modes by the operator control device based on at least one of a speed of the motor vehicle, ambient brightness and a motor mode of the motor vehicle.

19. The motor vehicle as claimed in claim 12,
further comprising a display device, and
wherein the lighting system controls the display device of the motor vehicle so that only selectable lighting modes which can be selected by the operator control device are displayed.

20. The motor vehicle as claimed in claim 19, wherein the lighting system controls the display device so that the selectable lighting modes are displayed only upon sensing that the operator control device has been touched.

\* \* \* \* \*